United States Patent
Kampanakis et al.

(10) Patent No.: US 12,267,437 B2
(45) Date of Patent: Apr. 1, 2025

(54) ENABLING INTERNAL AND EXTERNAL VERIFICATION OF HASH-BASED SIGNATURE COMPUTATIONS BY SIGNING SERVER

(71) Applicant: Cisco Technology, Inc., San Jose, CA (US)

(72) Inventors: Panagiotis Theodorou Kampanakis, Apex, NC (US); Dimitrios Sikeridis, San Diego, CA (US)

(73) Assignee: Cisco Technology, Inc., San Jose, CA (US)

(*) Notice: Subject to any disclaimer, the term of this patent is extended or adjusted under 35 U.S.C. 154(b) by 328 days.

(21) Appl. No.: 17/669,302

(22) Filed: Feb. 10, 2022

(65) Prior Publication Data

US 2023/0254154 A1    Aug. 10, 2023

(51) Int. Cl.
| | |
|---|---|
| H04L 9/32 | (2006.01) |
| G06F 15/16 | (2006.01) |
| H04L 15/16 | (2006.01) |
| H04L 29/06 | (2006.01) |
| H04L 29/08 | (2006.01) |

(52) U.S. Cl.
CPC .......... *H04L 9/3247* (2013.01); *H04L 9/3239* (2013.01)

(58) Field of Classification Search
CPC ........ H04L 9/3247; H04L 9/3239; H04L 9/50
USPC .......................................... 713/189; 712/189
See application file for complete search history.

(56) References Cited

U.S. PATENT DOCUMENTS

| | | | | |
|---|---|---|---|---|
| 11,159,326 B1* | 10/2021 | Nelson | ................. | G06F 3/0484 |
| 2016/0085955 A1* | 3/2016 | Lerner | ................. | H04L 9/0869 |
| | | | | 726/20 |
| 2017/0272250 A1* | 9/2017 | Kaliski, Jr. | ........... | H04L 9/3239 |
| 2017/0364700 A1* | 12/2017 | Goldfarb | ............... | H04L 9/3247 |
| 2018/0183602 A1* | 6/2018 | Campagna | ................ | H04L 9/14 |
| 2018/0183771 A1* | 6/2018 | Campagna | ............ | H04L 63/061 |
| 2018/0183774 A1* | 6/2018 | Campagna | ............ | H04L 9/3247 |
| 2019/0364042 A1* | 11/2019 | Liu | ...................... | H04W 12/069 |
| 2020/0052886 A1* | 2/2020 | Buldas | .................. | H04L 9/3247 |
| 2020/0090188 A1* | 3/2020 | Wince | ................... | H04L 9/3247 |
| 2020/0193025 A1 | 6/2020 | Jacquin et al. | | |

(Continued)

OTHER PUBLICATIONS

Hülsing et al., "Hash-Based Signatures: An Outline for a New Standard," https://csrc.nist.gov/csrc/media/events/workshop-on-cybersecurity-in-a-post-quantum-world/documents/papers/session5-hulsing-paper.pdf.

*Primary Examiner* — David R Lazaro
*Assistant Examiner* — Berhanu Shitayewoldetadik
(74) *Attorney, Agent, or Firm* — Lee & Hayes, P.C.

(57) ABSTRACT

Methods and systems enable internal and external verification of computations performed by a code signing server according to hash-based signature techniques using unique state, and further for a code signing server to expose parts of a hash-based signature log without negating the security of the one-time signature key pairs generated by the code signing server. A signing module of a code signing server receives a signing request from a client computing system. The signing module configures the code signing server to generate a one-time signature key pair based on a Merkle tree state. The signing module configures the code signing server to issue a hash-based signature to the client computing system. The code signing server is configured to record the Merkle tree state and the issued HBS in an immutably ordered log at a logging server.

5 Claims, 6 Drawing Sheets

(56) References Cited

U.S. PATENT DOCUMENTS

| | | | | |
|---|---|---|---|---|
| 2020/0259663 | A1* | 8/2020 | Firsov | H04L 9/30 |
| 2020/0302065 | A1* | 9/2020 | Lawson | G06F 16/9017 |
| 2020/0351074 | A1* | 11/2020 | Wood | H04L 9/0861 |
| 2020/0382301 | A1* | 12/2020 | Saket | H04L 9/3228 |
| 2020/0389521 | A1* | 12/2020 | Brock | H04L 9/50 |
| 2021/0192346 | A1* | 6/2021 | Taylor | G06N 3/088 |
| 2021/0326442 | A1* | 10/2021 | Campagna | H04L 63/067 |
| 2022/0368533 | A1* | 11/2022 | Irazábal | H04L 9/0894 |

\* cited by examiner

ENABLING INTERNAL AND EXTERNAL VERIFICATION OF HASH-BASED SIGNATURE COMPUTATIONS BY SIGNING SERVER

TECHNICAL FIELD

The present disclosure relates generally to configuring a code signing server to enable internal and external verification of computations performed according to hash-based signature techniques using unique state.

BACKGROUND

Increasingly, computer security researchers are investigating the field of post-quantum cryptography. The goal of such research is to replace common cryptographic algorithms in the art today, based on mathematical problems that can be solved by future quantum computers, with new algorithms that quantum computers cannot break.

For example, digital signature algorithms configure computing systems to generate signatures which authenticate the trustworthiness of digital documents or messages, and verify their integrity. Current public-key implementations of digital signatures are thought to be solvable by quantum computers, thus being rendered insecure in a post-quantum security environment. To replace public-key signature algorithms, security researchers have developed hash-based signature ("HBS") algorithms, with the majority of known implementations being based on the well-established technique of Merkle trees.

A Merkle tree is a data structure configured to manage a finite number of public key-private key pairs, each of which may only be used once to sign one digital document or message (generally referred to as a one-time signature ("OTS")). For example, RFC 8554, "Leighton-Micali Hash-Based Signatures" ("LMS"), and RFC 8391, "XMSS: eXtended Merkle Signature Scheme," both published by the Internet Engineering Task Force ("IETF"), propose HBS schemes based on generating private/public key pairs for signing documents or messages, where each private key may only be used to sign one document or message. These two proposals, in particular, are being adopted in the development of future security standards by the United States National Institute of Standards and Technology ("NIST"), as recommended in NIST Special Publication 800-208.

Furthermore, both the LMS and XMSS proposals are stateful signature schemes, requiring a computing system to change an internal state upon signing every document or message, and keep the internal state between signatures. A computing system can only guarantee that signatures are secure if it can guarantee that internal states are never reused from one signature to another. However, many computing systems are not configured to provide such guarantees, since many aspects of HBS implementation are not standardized, being greatly subject to developer discretion, and, furthermore, being protected against inspection in order to prevent exploitation by attackers. Furthermore, most computing systems which implement HBS cannot guarantee that their hardware and software components are error-free at all times, and most computing systems may suffer at any time from crashes, failures, data losses, and other errors which may cause the computing system to erroneously reuse an internal state to sign more than one document and/or message.

While operators of a computing system implementing an HBS algorithm may inspect the algorithm for correctness, it is desired to host such computing systems as cryptographic services accessible by client computing systems over public networks. Thus, there is a need to enable users of HBS services to verify the correctness of an HBS algorithm, without exposing the secrecy of the system or the HBS algorithm.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The devices depicted in the accompanying figures are not to scale and components within the figures may be depicted not to scale with each other.

DESCRIPTION OF EXAMPLE EMBODIMENTS

Overview

Figure 1:
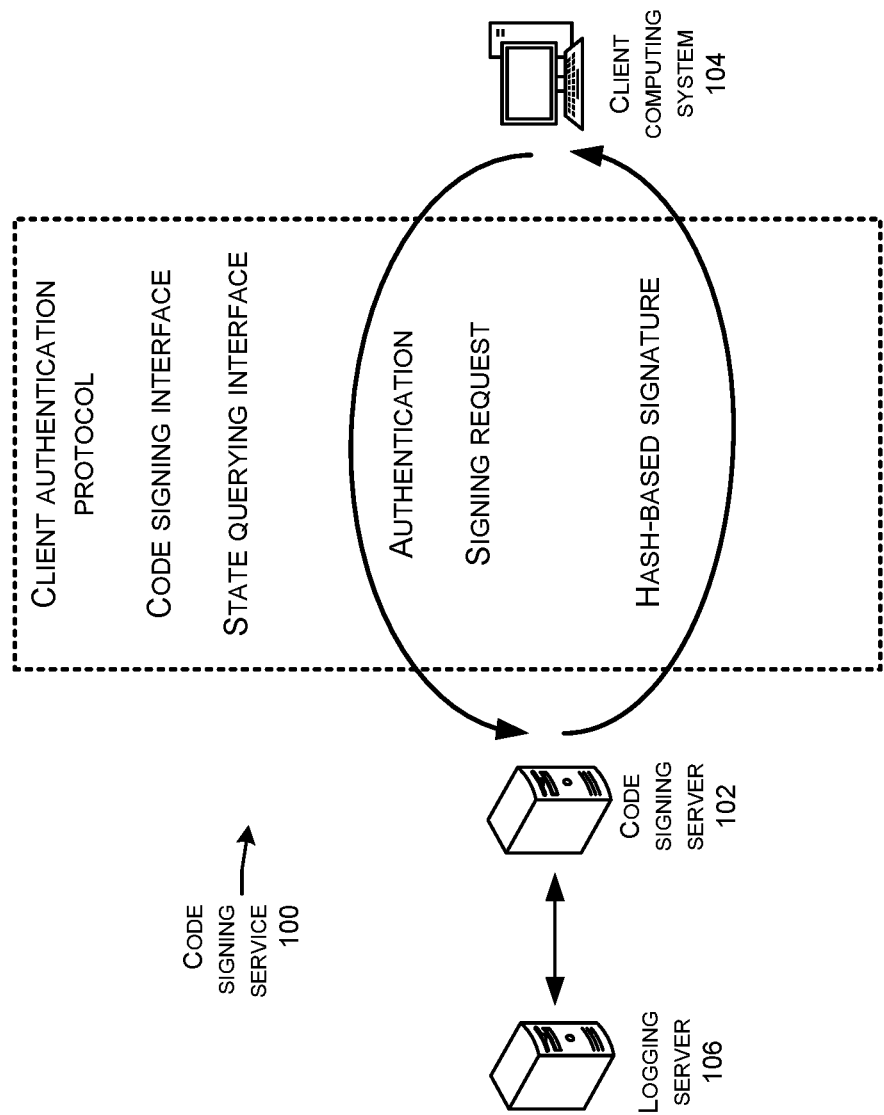
FIG. 1 illustrates a schematic diagram of a code signing service according to example embodiments of the present disclosure.

This disclosure describes techniques configuring a code signing server to enable internal and external verification of computations performed according to hash-based signature techniques using unique state, and further for a code signing server to expose parts of a hash-based signature log without negating the security of the one-time signature key pairs generated by the code signing server.

The described techniques may be implemented as services hosted on a computer or web server, distributed across multiple physically networked computers or web servers, distributed across computers or physical or virtual networks, or otherwise hosted by other computing architectures providing storage as known by persons skilled in the art. Such hosting may be in the form of an application or web server hosted over an Internet port providing a user interface enabling client computing systems to send requests and queries over the user interface.

The method includes a signing module of a code signing server receiving a signing request from a client computing system. The method further includes the signing module configuring the code signing server to generate a one-time signature key pair based on a Merkle tree state. The method further includes the signing module configuring the code signing server to issue a hash-based signature to the client computing system. Further, the method includes the signing module configuring the code signing server to record the Merkle tree state and the issued HBS signature in an immutably ordered log at a logging server. Further, the method includes the signing module sending an internal state query to the logging module, and the logging module configuring the logging server to compare the internally queried HBS state with states recorded in the immutably ordered log and reporting non-reuse. Further, the method includes the logging module configuring the logging server to autonomously report non-reuse of any state recorded in the immutably ordered log. Further, the method includes the logging module receiving an external state query from a client computing system based on an extracted Merkle tree state of a hash-based signature; configuring the logging server to look up the extracted Merkle tree state in an immutably ordered log of Merkle tree states and associated hash-based signatures; configuring the logging server to generate a salted hash of a logged hash-based signature returned from the lookup; and configuring the logging server to return the salted hash to the client computing system. Further, the method includes the logging module receiving an external reuse query from client computing system based on a state; configuring the logging server to look up the Merkle tree state in an immutably ordered log of Merkle tree states and associated hash-based signatures; and configuring the logging server to return a message to the client computing system depending on whether the immutably ordered log returned no match, one match, or multiple matches.

Additionally, the techniques described herein may be performed by a device having non-transitory computer-readable media storing computer-executable instructions that, when executed by one or more processors, performs the method described above.

Example Embodiments

Though the term "cryptographic service" may be defined broadly and differently in different contexts, according to the United States National Institute of Standards and Technology ("NIST"), a "cryptographic service" may refer to "a service that provides confidentiality, integrity, source authentication, entity authentication, non-repudiation support, access control and availability (e.g., encryption and decryption, and digital signature generation and verification)." Example embodiments of the present disclosure shall use the term "cryptographic service" in a manner consistent with this definition.

Example embodiments of the present disclosure shall refer to a code signing service as an example of a cryptographic service. A cryptographic service provider may host, on one or more computing hosts, a code signing server accessible over one or more networks to provide code signing services to client computing systems. The cryptographic service provider may perform code signing services as commercial services, commonly purchased by software developers and/or publishers for the benefit of end users of those developers and/or publishers.

In personal and enterprise computing, end users are at risk of installing and running malicious software on their personal computing systems; many examples of malicious software may be falsely labeled (i.e., they are not authentic), or may be samples of benign software which have been altered or tampered (i.e., their integrity has been compromised). A cryptographic service provider may perform code signing services by generating a public-key private-key pair, the private key being generated at a client computing system; a customer of the cryptographic service provider may thereafter request the cryptographic service provider to sign computer-executable object code, such as applications and hardware drivers, using a public key paired with the private key. Thus, the customer of a code signing service may be referred to as a "signer." The signer is responsible for maintaining the private key in secrecy.

Commonly, the performance of code signing services by a code signing server includes, in addition to the code signing server signing computer-executable object code, the code signing server generating code signing certificates upon request by a signer. The signer may bundle the code signing certificate, which uniquely identifies the signer, with computer-executable object code distributed to end users of the signer. Modem operating systems installed on common end user computing systems are configured to verify both the code signing certificate and the computer-executable object code, to confirm that the object code has not been modified since signing (i.e., its integrity is not compromised), and to confirm that the code signing certificate is issued by a code signing server hosted by a trustworthy cryptographic service provider.

A code signing certificate can only perform its intended function if both the signer and the end users of the signer trust the cryptographic service provider (i.e., operating systems running on end user computing systems are configured to trust the cryptographic service provider). Since the cryptographic service provider is a third party to both the signer and the end users, and numerous signers, each having numerous relations with additional end users, exist in the market for cryptographic services, establishing trust with all these entities as an unrelated third party is not merely a matter of technological solutions. To establish a reputation as a publicly trusted certificate authority, cryptographic service providers must submit their technological systems and business practices to a variety of rigorous scrutiny and auditing by the public, the precise nature of which is beyond the scope of the present disclosure.

However, cryptographic service providers may implement various technological solutions to secure their computing systems and computing hosts, thereby demonstrating trustworthiness of their cryptographic technology and security technology. For example, CISCO SYSTEMS, INC. of San Jose, California provides a variety of computing systems under the "Trustworthy Systems" concept. "Trustworthy Systems" generally describes a variety of computing systems which may be secured in any combination of one or more ways, including secured against tampering of software executed by the computing system; secured against unauthorized network communications and malicious attacks over a network; secured against unauthorized execution of code by software running on the computing system, such as by implementing software containers; and the like. For example, such computing systems may include a Trusted Platform Module ("TPM") which stores secret information, enabling a remote server to perform attestation of the TPM as being an authentic computing platform.

Additionally, such computing system may perform computations by a field-programmable gate array ("FPGA") configured in a trusted fashion, such as having a hardware root of trust integrated therein; being programmed to only perform computations in a trusted mode; and utilizing solid-state memory in a trusted fashion, as well as storing secret information which may uniquely identify a hardware platform. As an example, CISCO SYSTEMS, INC. of San Jose, California provides trusted FPGAs under the Trust Anchor module ("TAm") name.

By implementing multiple layers of security measures on these computing systems and publicly announcing their implementation, cryptographic service providers may demonstrate that a computing host where a code signing server is hosted is trustworthy in computing infrastructure. Conventionally, cryptographic service providers may also demonstrate their trustworthiness by institutional name recognition, reputation in business transactions, and other such means.

Moreover, in today's computing environment, various cryptographic algorithms have been widely deployed by cryptographic service providers as industry standards, and consequently demonstrated as secure in practical services; thus, it has generally ceased to be necessary for cryptographic service providers to demonstrate trustworthiness of such industry-standard cryptographic algorithms. The trustworthiness of public-key cryptography techniques underlying signature algorithms, as well as any number of other cryptographic algorithms, is widely accepted as a consequence of such industry-wide deployment and demonstrations of security. Moreover, persons skilled in the art have established widely accepted techniques to audit and certify such public-key cryptography techniques to verify their trustworthiness.

Post-quantum cryptography, in contrast, is expected to entail new cryptographic algorithms which are secure against the theorized quantum algorithms implemented in future quantum computers. As a result, as cryptographic service providers start to provide cryptographic services designed for a post-quantum computing environment, they must begin to deploy cryptographic algorithms. Customers who are skilled in the field of cryptography may, for example, request to inspect the results of computations performed by a computing system according to a cryptographic algorithm, in order to manually confirm that the computations were computed correctly. However, the security of the cryptographic algorithm cannot be maintained if the entirety of the computations performed by the computing system, is made available for inspection.

Therefore, the correctness of post-quantum cryptographic computations on a computing system may be unprovable merely from the trustworthiness of the system itself, even if the system can be remotely attested as authentic and even if the system has a hardware root of trust integrated; and may not be mathematically provable. This remains a substantial obstacle to enabling post-quantum cryptographic algorithms to be checked without compromising security of the cryptographic algorithm, so as to establish one-on-one trustworthiness and acceptance with individual customers.

Therefore, example embodiments of the present disclosure provide a state querying interface for hash-based signature algorithms, allowing a signer to perform state reuse verification of a cryptographic service hosted on a code signing server provided by a cryptographic service provider, by sending state queries to a logging server provided by the cryptographic provider.

FIG. 1 illustrates a schematic diagram of a code signing service 100 according to example embodiments of the present disclosure. A code signing service 100 may include one or more applications running on a computing system and/or one or more services hosted on a computing host, subsequently referenced as a "code signing server 102," accessible over one or more networks, operated by a cryptographic service provider.

Such services as described herein may be hosted on a computer or web server, distributed across multiple physically networked computers or web servers, distributed across computers or physical or virtual networks, or otherwise hosted by other computing architectures providing storage as known by persons skilled in the art. Such hosting may be in the form of an application or web server hosted over an Internet port providing a user interface enabling client computing systems to send requests and queries over the user interface (as shall be described subsequently).

According to example embodiments of the present disclosure, a code signing service 100 may be configured to a provide code signing services from a code signing server 102 to any number of client computing systems 104 by communicating across one or more networks. A customer of the cryptographic service provider who requests the code signing service 100 as a commercial service may be referred to as a "signer."

A signer may operate a client computing system 104 to access the code signing server 102 over a network connection, according to a client authentication protocol which configures the code signing server 102 and the client computing system 104 to exchange messages by a security protocol as known to persons skilled in the art, authenticating the client computing system 104 as belonging to a customer authorized to request code signing. A signer, after authentication, may operate the client computing system 104 to request code signing from the code signing server 102 over a network connection, according to a code signing interface, such as an application programming interface ("API") which configures the client computing system 104 to send requests to the code signing server 102, configuring the code signing server 102 to execute one or more sets of computer-executable instructions stored in memory and/or storage of the code signing server 102.

The code signing server 102 may be configured to handle a signing request according to a code signing interface. The code signing server 102 may be configured to, upon receiving a signing request from a client computing system 104, issue an HBS. The code signing server 102 may be configured to issue to the signer an HBS based on a Merkle tree, a data structure configured to provide a finite number of public-key private-key pairs, the public keys being stored at the nodes of a tree structure. An HBS according to example embodiments of the present disclosure includes a one-time signature ("OTS") public-key private-key pair based on a hash-based signature ("HBS") technique: an OTS signature using a private key, and an authentication path which traverses the Merkle tree for the corresponding HBS public key. For the purpose of understanding example embodiments of the present disclosure, it should be understood that the Merkle tree is configured to yield a finite number of OTS public key-private key pairs.

Thus, the code signing server 102 may issue an HBS to the client computing system 104 of the signer. Performance of code signing by the code signing server 102 is thus completed.

The finite OTS key pairs corresponding to the a Merkle tree leaves are tracked by an index, which is otherwise referenced as "state" herein. The state of a Merkle tree iterates through various possible values, and each value of the state indicates that some OTS key pairs of the Merkle tree have not been used in a signature, while all other OTS key pairs have been used. Therefore, as soon as the code signing server 102 issues any HBS to a signer, the state of the Merkle tree must be advanced to track the usage of an OTS key pair and to ensure that the OTS key pair is not used a second time.

However, the tracking and advancement of the state of a Merkle tree may be subject to routine hardware and/or software errors in the course of operating a computing system or a computing host underlying the code signing server 102. For example, hardware failures, such as an incomplete scheduled write to memory resulting from a power loss, may cause state tracking to become temporarily out of date, which may result in erroneous reuse of the same state to issue more than one HBS. Persons skilled in the art will appreciate that though a cryptographic algorithm may be correct in theory, a set of computer-executable instructions which implement a cryptographic algorithm may not always be performed correctly by a computing system in all instances. An erroneous implementation of HBS techniques may result in states being erroneously reused.

Persons skilled in the art will also appreciate that computing systems and computing hosts may suffer from such unforeseen failures time to time, and, when such a failure occurs, it may be challenging to identify whether the failure resulted in an error in state tracking. Even if an error in state tracking is detected and corrected in a timely fashion, the erroneous issuance of more than one HBS using the same state may lead to signature forgeries.

Persons skilled in the art will also appreciate that signers evaluating options for cryptographic service providers for business purposes may require assurances that a particular cryptographic service provider has correctly implemented state tracking as described above, and/or has successfully avoided issuance of more than one HBS using the same state.

Consequently, a code signing service 100 according to example embodiments of the present disclosure further provides a state querying interface which may be hosted on a computing host, subsequently referenced as a "logging server 106," accessible over one or more networks, operated by a cryptographic service provider (or may be, alternatively, hosted on the code signing server 102).

Figure 2:
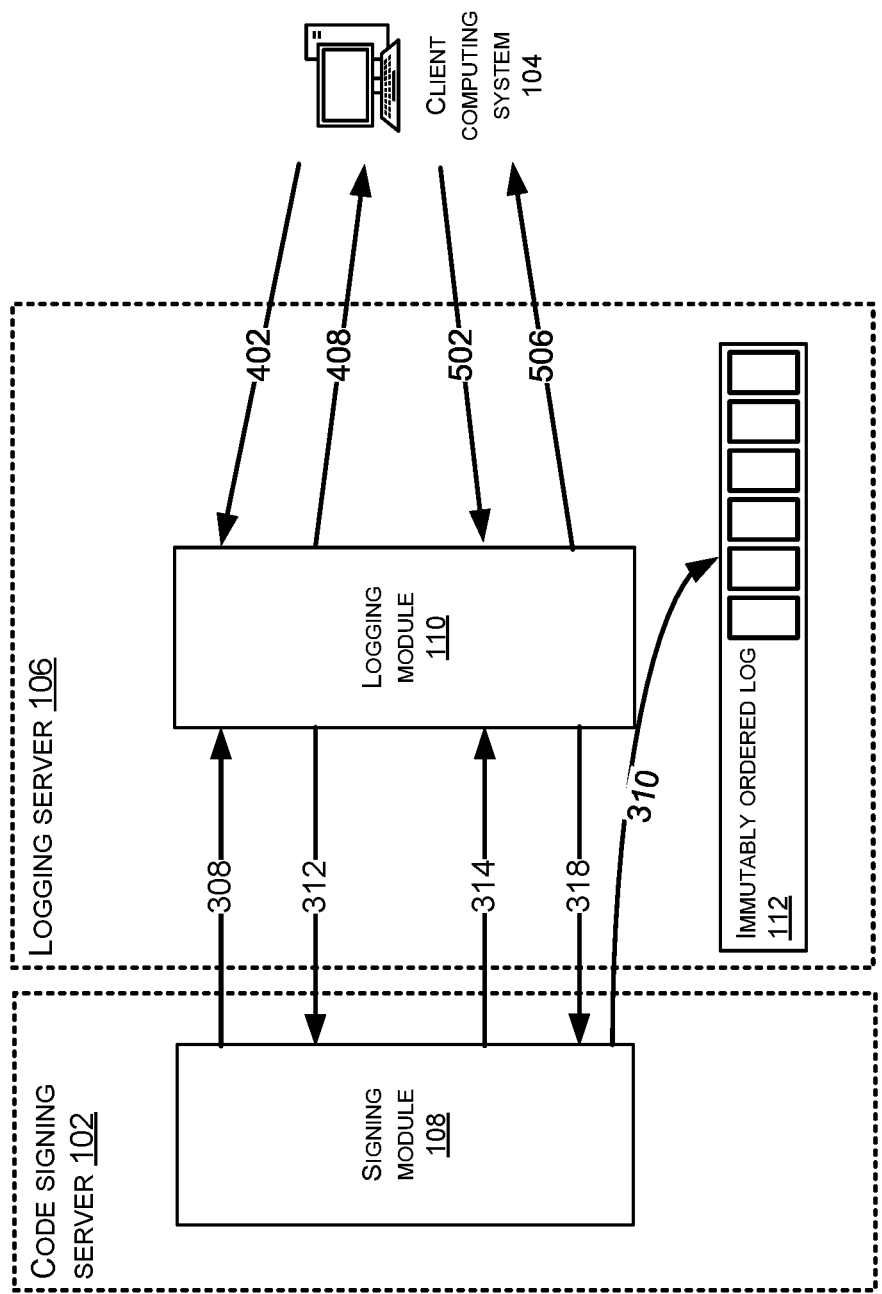
FIG. 2 illustrates a schematic diagram of a code signing server according to example embodiments of the present disclosure.

FIG. 2 illustrates a schematic diagram of a code signing server 102 and a logging server 106 according to example embodiments of the present disclosure. To perform code signing, the code signing server 102 may run computer-executable instructions including a signing module 108. To perform logging (as shall be described subsequently), the logging server 106 may run computer-executable instructions including a logging module 110. It should be understood that, while a same computing system may run both the signing module 108 and the logging module 110, separate computing systems running these modules may improve performance of the respective modules by providing each with dedicated computing resources. The signing module 108 is configured to process requests received by the code signing server 102 according to a code signing interface as described above by configuring the code signing server 102 to perform each of the above-described steps, such as issuing an HBS, and tracking the state of a Merkle tree by advancing the state after issuing each HBS. The signing module 108 may further configure the code signing server 102 to store the Merkle tree and a state thereof.

Moreover, example embodiments of the present disclosure provide a state querying interface. The state querying interface may be, for example, a common API as the above-mentioned code signing interface, or may be a separate API from the above-mentioned code signing interface. Such an interface may be hosted as an application or web server providing a web-hosted graphical user interface, command line interface, SQL interface, API, or other web interfaces suitable for querying data upon being operated by a signer connecting to an Internet port of the web server by operating a computing device.

Moreover, example embodiments of the present disclosure provide a logging interface. The logging interface may be hosted on the logging server 106 as any web API suitable for logging data received from calls to the logging interface by another computing host connecting to an Internet port of the logging server 106.

A signer, after authentication, may operate the client computing system 104 to query a state from the logging server 106 over a network connection, according to a state querying interface which configures the client computing system 104 to send state queries to the code logging server 106, the logging module 110 configuring the logging server 106 to execute one or more sets of computer-executable instructions stored in memory and/or storage of the logging server 106 to handle these state queries. The signer may send state queries to the logging server 106 at any time after receiving an HBS from the code signing server 102. Particularly, the signer may send state queries before or while signing software or hardware using the HBS, in order to manually verify that the HBS was not issued erroneously.

Additionally, the signing module 108 configures the code signing server 102 to execute calls to the state querying interface to send queries to the logging module 110, and the logging module 110 also configures the logging server 106 to execute one or more sets of computer-executable instructions stored in memory and/or storage of the logging server 106 to handle these internal queries. Thus, a state querying interface according to example embodiments of the present disclosure enables both a cryptographic service provider to operate a logging server 106 to query its own state logging to verify state tracking and advancement, and a signer to query the logging server 106 to externally verify state tracking and advancement.

Though state queries do not provide conclusive proof that all computations of a code signing server 102 are algorithmically correct, state queries can nevertheless enable both the cryptographic service provider and signers who are skilled in the art to manually verify one aspect of the computations performed by a code signing server 102 which issues OTS key pairs according to an HBS technique: the aspect of correctly tracking and advancing Merkle tree state. Due to the importance of these computations, even manual verification of these computations alone may substantially improve trustworthiness of the code signing service 100 being provided by the cryptographic service provider.

The logging module 110 may configure the logging server 106 to handle a logging request, an internal state query, an external state query, and an external reuse query. The performance of each of these operations shall be described in more detail subsequently.

The signing module 108 may send a logging request to the logging module 110, from the code signing server 102 to the logging server 106. According to example embodiments of the present disclosure, one logging request may be sent following every issuance of an HBS.

In making the logging request, the code signing server 102 may call a logging interface of the logging server, as described above, providing the Merkle tree state and the issued HBS as a new log entry. In this fashion, the signing module 108 may configure the code signing server 102 to record a state of the Merkle tree and an issued HBS in an immutably ordered log 112 at the logging server 106. The immutably ordered log 112 may be an append-only Merkle tree of unlimited size (which should be understood as a different data structure from the above-mentioned fixed-size Merkle tree from which OTS key pairs are derived); a one-way hash chain; a log according to blind-aggregate-forward improved ("BAFi") as proposed by Kampanakis et al., "BAFi: a practical cryptographic secure audit logging scheme for digital forensics", *Security Comm. Networks*

2015; 8:3180-3190; a log according to Logcrypt as proposed by Holt et al., "Logcrypt: forward security and public verification for security audit logs", *Proceedings of the 4th Australasian workshops on grid computing and e-research*, 2006; 203-211; a log according to FssAgg as proposed by Ma et al., "Forward-secure sequential aggregate authentication", *Proceedings of the 28th IEEE symposium on security and privacy*, 2007; 86-91; and other such data structures as known to persons skilled in the art. Further details of implementing an immutably ordered log need not be detailed herein, except to say that the logging server 106 should write each record of the immutably ordered log 112 in a data structure which may only be written to in sequential order, and provide security which guarantees the integrity of the write order of the log 112.

The recorded state in the logging request should be a state of a Merkle tree used to generate an OTS key pair of the HBS. However, in any case, a state and an associated HBS should be recorded separately in association in an entry of a log 112, so that the logging server 106 may perform a lookup operation over the log 112 indexed by state, to return only an entry containing on particular state.

It should be understood that an immutably ordered log 112 should be distinguished from publicly auditable digital certificate logs as described by RFC 6962, "Certificate Transparency." According to Certificate Transparency, digital certificate logs, which may be Merkle trees, are presented to auditors for inspection. However, cryptographic service providers, for various business reasons, may not desire to expose HBSs to public inspection in this manner. Consequently, a logging server 106 does not open an immutably ordered log 112 to public inspection to verify that HBSs were correctly issued without reusing state; instead, example embodiments of the present disclosure provide state queries that allow the immutably ordered log 112 to be inspected in part.

The logging module 110 may further configure the logging server 106 to return an ACK message to the signing module 108 after successfully recording the state and the issued HBS in an immutably ordered log 112.

Moreover, the signing module 108 may send an internal state query to the logging module 110. According to example embodiments of the present disclosure, an administrator of a code signing server 102 may, at any time, decide to manually verify that a Merkle tree had a particular state at the time that it was used to generate OTS keys of a particular issued HBS. Furthermore, the signing module 108 may at any time autonomously verify, before generating OTS keys in response to a signing request, that a current state of a Merkle tree was not previously already used to generate OTS keys. Thus, in either such case, a state that is subject to this verification is referred to as an "internally queried state," and the internal state query forwards an internally queried state to the logging module 110. The logging module 110 configures the logging server 106 to look up the internally queried state in the immutably ordered log 112, returning a message indicating whether an HBS associated with the internally queried state is recorded in the log 112.

In the event that the logging server 106 finds the internally queried state recorded in the immutably ordered log, the logging server 106 returns an ACK message to the signing module 108. In the event that the logging server 106 does not find the internally queried state in the immutably ordered log, the logging server 106 returns a NACK message to the signing module 108 (meaning that the internally queried state has not been used).

Moreover, a client computing system 104 may send an external state query to the logging module 110 over a network connection. According to example embodiments of the present disclosure, a signer operating a client computing system 104, who has already received, at the client computing system 104, an HBS from the logging server 106 in response to a prior request, may now wish to determine whether a state was erroneously reused in issuing OTS key pairs for both the query HBS and another HBS. The client computing system 104, in sending the external state query, may forward the query state to the logging module 110; or, the client computing system 104, in sending the external state query, may extract a state recorded in the query HBS, and forward the extracted state to the logging module 110; or, a signer skilled in the art may manually determine a state recorded in the query HBS, and the client computing system 104, in sending the external state query, may forward the extracted state to the logging module 110.

The logging module 110 then configures the logging server 106 to look up an extracted state in the immutably ordered log 112. The lookup may cause the immutably ordered log 112 to return one HBS or return no HBS, in either case indicating that the extracted state was not erroneously reused; or the lookup may cause the immutably ordered log 112 to return more than one HBS, indicating that the extracted state was erroneously reused.

In the event that the lookup returns more than one HBS, the logging module 110 may configure the logging server 106 to return a message indicating that the extracted state has been erroneously reused. The logging server 106 does not need to return any of the HBSs, since they are no longer relevant to the signer's interests; the signer does not need to further verify reuse of state, and should not continue to use the HBS received by the signer for any purpose.

In the event that the lookup returns only one HBS, the cryptographic service provider can be confident in its determination that the extracted state was not erroneously reused. However, the signer has not yet had an opportunity to independently verify the same. Thus, the logging module 110 may configure the logging server 106 to input the HBS returned from the log 112, and a random cryptographic salt, into a one-way hash function, such as SHA-256, returning a salted hash of the HBS signature. The logging module 110 then configures the logging server 106 to return the salted hash and the salt to the client computing system 104.

In the event that the lookup returns no HBS, the cryptographic service provider can also be confident in its determination that the extracted state was not erroneously reused. However, the logging server 106 cannot provide any evidence with which the signer can independently verify the same. In the absence of an HBS which can be salted and returned, the logging module 110 may configure the logging server 106 to return a NACK message to the client computing system 104, representing a statement that the extracted state was not erroneously reused.

A malicious party seeking to perform a multi-target attack on the logging server 106 may attempt to send multiple state queries to the logging module 110 to obtain multiple HBSs. However, because the logging server 106 returns salted hashes, such malicious parties will fail to derive any advantage from the returned values.

The logging server 106 thus provides the signer with all data necessary to independently verify that the extracted state was not erroneously reused: the signer may operate any computing system to input the HBS originally received by the signer, as well as the cryptographic salt, into the same one-way hash function to return a counterpart salted hash.

The signer may operate any computing system to compare the returned salted hash and the counterpart salted hash, thereby verifying that both salted hashes were derived from the same HBS at the logging server 106 and at the signer's computing system, respectively. In this fashion, the signer has independently and manually verified that the extracted state was not erroneously reused (though it should be understood that the signer will need to trust that the logging server 106 will not falsely return one HBS even if the lookup returned multiple HBSs).

Moreover, a client computing system 104 may send an external reuse query to the logging module 110 over a network connection. According to example embodiments of the present disclosure, a signer operating a client computing system 104, regardless of whether in possession of a returned HBS or not, may want the logging server 106 to self-report regarding whether a state has been erroneously reused or not. In the event that the signer is in possession of a returned HBS, the signer may be interested in whether a state of the HBS was erroneously reused.

Therefore, the client computing system 104, in sending the external reuse query, may forward an extracted state or an arbitrary state to the logging module 110. The logging module 110 then configures the logging server 106 to look up the state in the immutably ordered log 112. The lookup may match one entry of the log 112 or may match no entries of the log 112, indicating that the extracted state was not erroneously reused; or the lookup may match more than one entry of the log 112, indicating that the extracted state was erroneously reused.

In the event that the lookup matches only one entry or matches no entries, the logging module 110 may configure the logging server 106 to return a message to the client computing system 104 indicating that the extracted state has not been erroneously reused. In the event that the lookup matches more than one entry, the logging module 110 may configure the logging server 106 to return a message to the client computing system 104 indicating that the extracted state has been erroneously reused. In either case, the logging server 106 does not need any hashed HBSs returned from the log 112, as it will not return any HBS to the client computing system 104.

Additionally, the logging module 110 may autonomously report non-reuse of any state recorded in the immutably ordered log 112. To do so, the logging module 110 may configure the logging server 106 to periodically traverse the entire immutably ordered log 112, and determine whether any state is recorded once, more than once, or not at all in the log 112. The logging server 106 may return a report indicating state non-reuse, or indicating state reuse, depending on the outcome of the traversal, similar to the outcomes described above.

Figure 3:
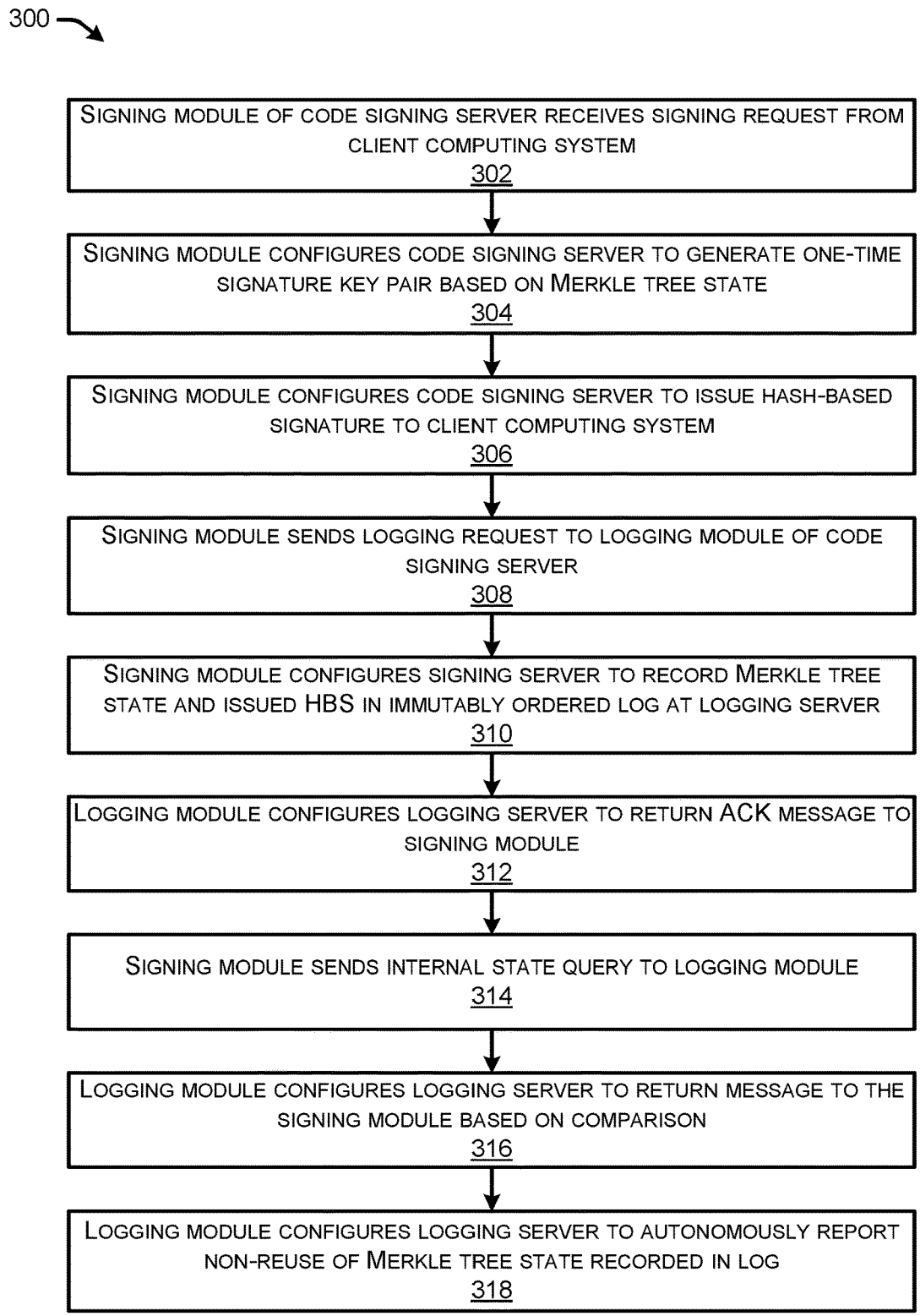
FIG. 3 illustrates a flowchart of a signature issuing and logging method according to example embodiments of the present disclosure.

FIG. 3 illustrates a flowchart of a signature issuing and logging method 300 according to example embodiments of the present disclosure.

At a step 302, a signing module of a code signing server receives a signing request from a client computing system.

A signer may operate a client computing system to access the code signing server over a network connection, according to a client authentication protocol which configures the code signing server and the client computing system to exchange messages by a security protocol as known to persons skilled in the art, authenticating the client computing system as belonging to a customer authorized to request code signing. A signer, after authentication, may operate the client computing system to request code signing from the code signing server over a network connection, according to a code signing interface, such as an application API which configures the client computing system 104 to send requests to the code signing server, configuring the code signing server to execute one or more sets of computer-executable instructions stored in memory and/or storage of the code signing server.

At a step 304, the signing module configures the code signing server to generate a one-time signature key pair based on a Merkle tree state.

An HBS according to example embodiments of the present disclosure includes an OTS public-key private-key pair based on an HBS technique: an OTS signature using a private key, and an authentication path which traverses the Merkle tree for the corresponding OTS public key.

The finite OTS key pairs derived from a Merkle tree are tracked by an index, which is otherwise referenced as "state". The state of a Merkle tree iterates through various possible values, and each value of the state indicates that some OTS key pairs of the Merkle tree have not been used in a signature, while all other OTS key pairs have been used.

At a step 306, the signing module configures the code signing server to issue a hash-based signature to the client computing system.

Performance of code signing by the code signing server is thus completed. The signer is then able to distribute a software product or a hardware product of the signer to end users, with the signature enclosed to certify its authenticity and integrity.

At a step 308, the signing module sends a logging request to a logging module of a logging server.

According to example embodiments of the present disclosure, one logging request is sent following every issuance of an HBS.

At a step 310, the signing module configures the code signing logging server to record the Merkle tree state and the issued HBS in an immutably ordered log at a logging server.

The code signing server may call a logging interface of the logging server, as described above, providing the Merkle tree state and the issued HBS as a new log entry.

The immutably ordered log may be an append-only Merkle tree of unlimited size (which should be understood as a different data structure from the above-mentioned fixed-size Merkle tree from which OTS key pairs are derived); a one-way hash chain; a log according to BAFi; a log according to Logcrypt; a log according to FssAgg; and other such data structures as known to persons skilled in the art. Further details of implementing an immutably ordered log need not be detailed herein, except to say that the logging server should write each record of the immutably ordered log in a data structure which may only be written to in sequential order, and provide security which guarantees the integrity of the write order of the log.

The recorded state in the logging request should be a state of a Merkle tree used to generate an OTS key pair of the HBS. Thus, the signing module should send the logging request immediately after issuance of an HBS before advancing state of the Merkle tree, or, in the event that the signing module has already caused the state of the Merkle tree to advance, the signing module should send the logging request using a previous state of the Merkle tree. Alternatively, the state may be derived from the HBS itself. However, in any case, a state and an associated HBS should be recorded separately in association in an entry of a log, so that the logging server may perform a lookup operation over the log indexed by state, to return only an entry containing on particular state.

At a step 312, the logging module configures the logging server to return an ACK message to the signing module.

At a step 314, the signing module sends an internal state query to the logging module.

According to example embodiments of the present disclosure, an administrator of a code signing server may, at any time, decide to manually verify that a Merkle tree had a particular state at the time that it was used to generate OTS keys of a particular issued HBS. Furthermore, the signing module 108 may at any time autonomously verify, before generating OTS keys in response to a signing request, that a current state of a Merkle tree was not previously already used to generate OTS keys. Thus, in either such case, a state that is subject to this verification is referred to as an "internally queried state," and the internal state query forwards an internally queried state. The logging module configures the logging server to look up the internally queried state in the immutably ordered log, returning a message indicating whether an HBS associated with the internally queried state is recorded in the log.

At a step 316, the logging module configures the logging server to return a message to the signing module based on the comparison.

In the event that the logging server 106 found the internally queried state was recorded in the immutably ordered log, the code signing server 102 returns an ACK message to the signing module 108. In the event that the logging server 106 failed to find the internally queried state recorded in the immutably ordered log, the code signing server 102 returns a NACK message to the signing module 108 (meaning that the internally queried HBS state was not used to generate OTS keys).

At a step 318, the logging module configures the logging server to autonomously report non-reuse of any Merkle tree state recorded in the immutably ordered log.

The logging module may configure the logging server to periodically traverse the entire immutably ordered log, and determine whether any state is recorded more than once in the log. The logging server may return a report indicating state non-reuse, or indicating state reuse, depending on the outcome of the traversal.

Figure 4:
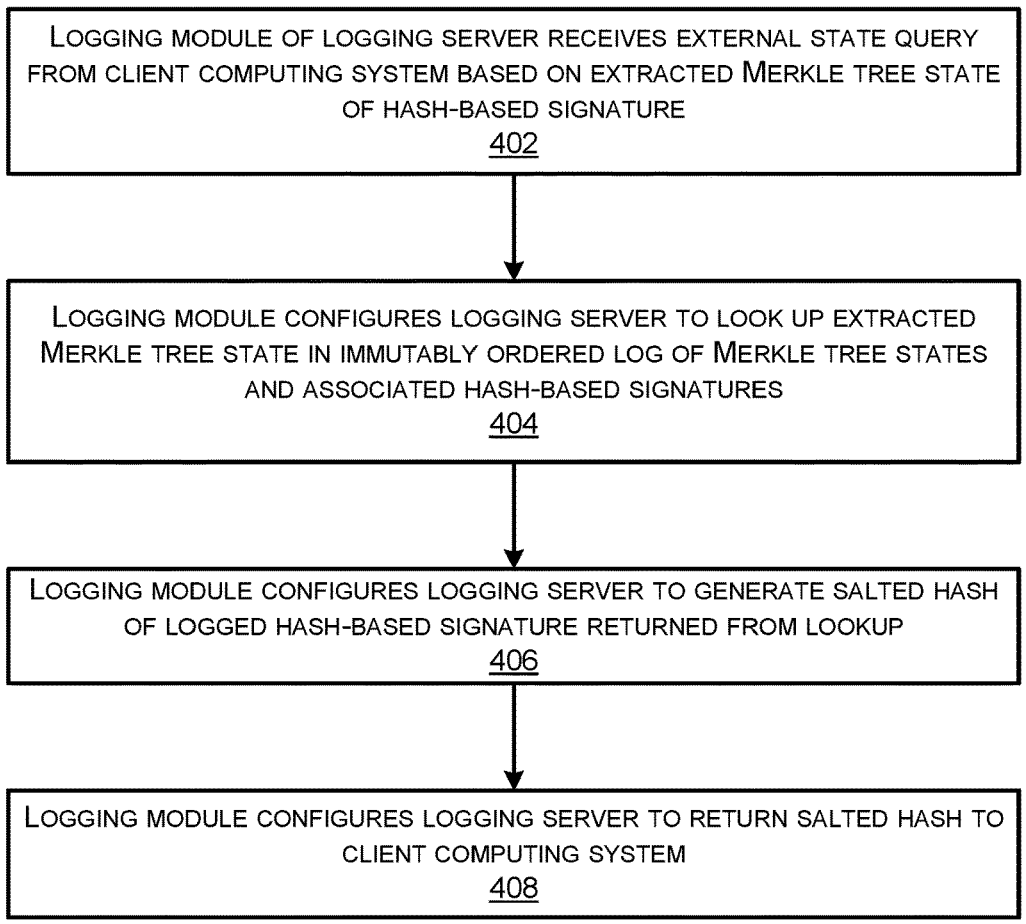
FIG. 4 illustrates a flowchart of a state querying method according to example embodiments of the present disclosure.

FIG. 4 illustrates a flowchart of a state querying method 400 according to example embodiments of the present disclosure.

At a step 402, a logging module of a logging server receives an external state query from a client computing system based on an extracted Merkle tree state of a hash-based signature.

A client computing system may send an external state query to the logging module over a network connection. According to example embodiments of the present disclosure, a signer operating a client computing system, who has already received an HBS from the logging server in response to a prior request, may now wish to determine whether a state was erroneously reused in issuing OTS key pairs for both the query HBS and another HBS. The client computing system, in sending the external state query, may forward the query HBS to the logging module; or, the client computing system, in sending the external state query, may extract a state recorded in the query HBS, and forward the extracted state to the logging module; or, a signer skilled in the art may manually determine a state recorded in the query HBS, and the external state query may forward the extracted state to the logging module.

The logging module then configures the logging server to extract a state from the query HBS, in the event that the external state query forwarded a query HBS.

At a step 404, the logging module configures the logging server to look up the extracted Merkle tree state in an immutably ordered log of Merkle tree states and associated hash-based signatures.

In any event, the logging module then configures the logging server to look up an extracted state in the immutably ordered log. The lookup may cause the immutably ordered log to return one HBS or no HBS, indicating that the extracted state was not erroneously reused; or the lookup may cause the immutably ordered log to return more than one HBS, indicating that the extracted state was erroneously reused.

In the event that the lookup returns more than one HBS, the logging module may configure the logging server to return a message indicating that the extracted state has been erroneously reused. The logging server does not need to return any of the HBSs, since they are no longer relevant to the signer's interests; the signer does not need to further verify reuse of state, and should not continue to use the HBS received by the signer for any purpose.

At a step 406, in the event that the lookup returns only one HBS, the logging module configures the logging server to generate a salted hash of a logged hash-based signature returned from the lookup.

At a step 408, the logging module configures the logging server to return the salted hash and the salt to the client computing system.

In the event that the lookup returns only one HBS, the cryptographic service provider can be confident in its determination that the extracted state was not erroneously reused. However, the signer has not yet had an opportunity to independently verify the same. Thus, the logging module may configure the logging server to input the HBS returned from the log, and a random cryptographic salt, into a one-way hash function, such as SHA-256, returning a salted hash. The logging module then configures the logging server to return the salted hash with the salt to the client computing system.

The logging server thus provides the signer with all data necessary to independently verify that the extracted state was not erroneously reused: the signer may operate any computing system to input the HBS originally received by the signer, as well as the cryptographic salt, into the same one-way hash function to return a counterpart salted hash. The signer may operate any computing system to compare the returned salted hash and the counterpart salted hash, thereby verifying that both salted hashes were derived from the same HBS function at the logging server and at the signer's computing system, respectively. In this fashion, the signer has independently and manually verified that the extracted state was not erroneously reused (though it should be understood that the signer will need to trust that the logging server will not falsely return one HBS even if the lookup returned multiple HBSs).

Figure 5:
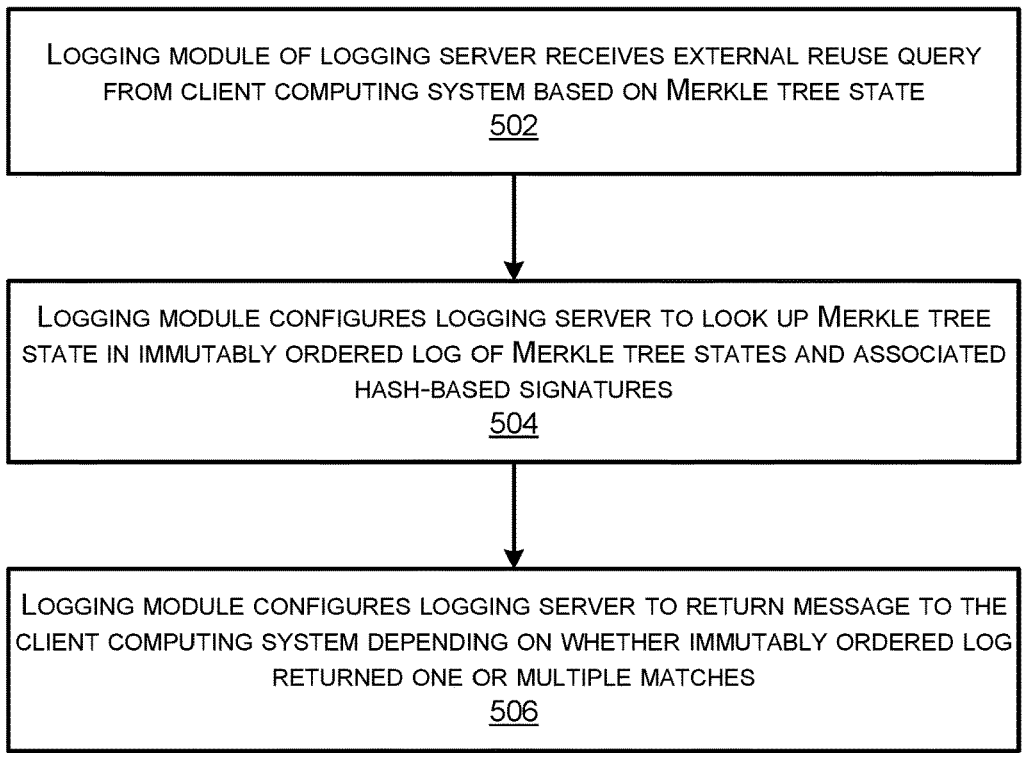
FIG. 5 illustrates a flowchart of a reuse querying method according to example embodiments of the present disclosure.

FIG. 5 illustrates a flowchart of a reuse querying method 500 according to example embodiments of the present disclosure.

At a step 502, a logging module of a logging server receives an external reuse query from client computing system based on a Merkle tree state.

A client computing system may send an external reuse query to the logging module over a network connection. According to example embodiments of the present disclosure, a signer operating a client computing system, regardless of whether in possession of a returned HBS or not, may want the logging server to self-report regarding whether a state has been erroneously reused or not. In the event that the signer is in possession of a returned HBS, the signer may be interested in whether a state of the HBS was erroneously reused.

Therefore, the client computing system, in sending the external reuse query, may forward an extracted state or an arbitrary state to the logging module.

At a step 504, the logging module configures the logging server to look up the state in an immutably ordered log of Merkle tree states and associated hash-based signatures.

The lookup may match one entry of the log or no entry, indicating that the extracted state was not erroneously reused; or the lookup may match more than one entry of the log, indicating that the extracted state was erroneously reused.

At a step 506, the logging module configures the logging server to return a message to the client computing system depending on whether the immutably ordered log returned one, none or multiple matches.

In the event that the lookup matches only one entry or no entry, the logging module may configure the logging server to return a message indicating that the extracted state has not been erroneously reused. In the event that the lookup matches more than one entry, the logging module may configure the logging server to return a message indicating that the extracted state has been erroneously reused. In either case, the code signing server does not need any HBSs returned from the log.

Figure 6:
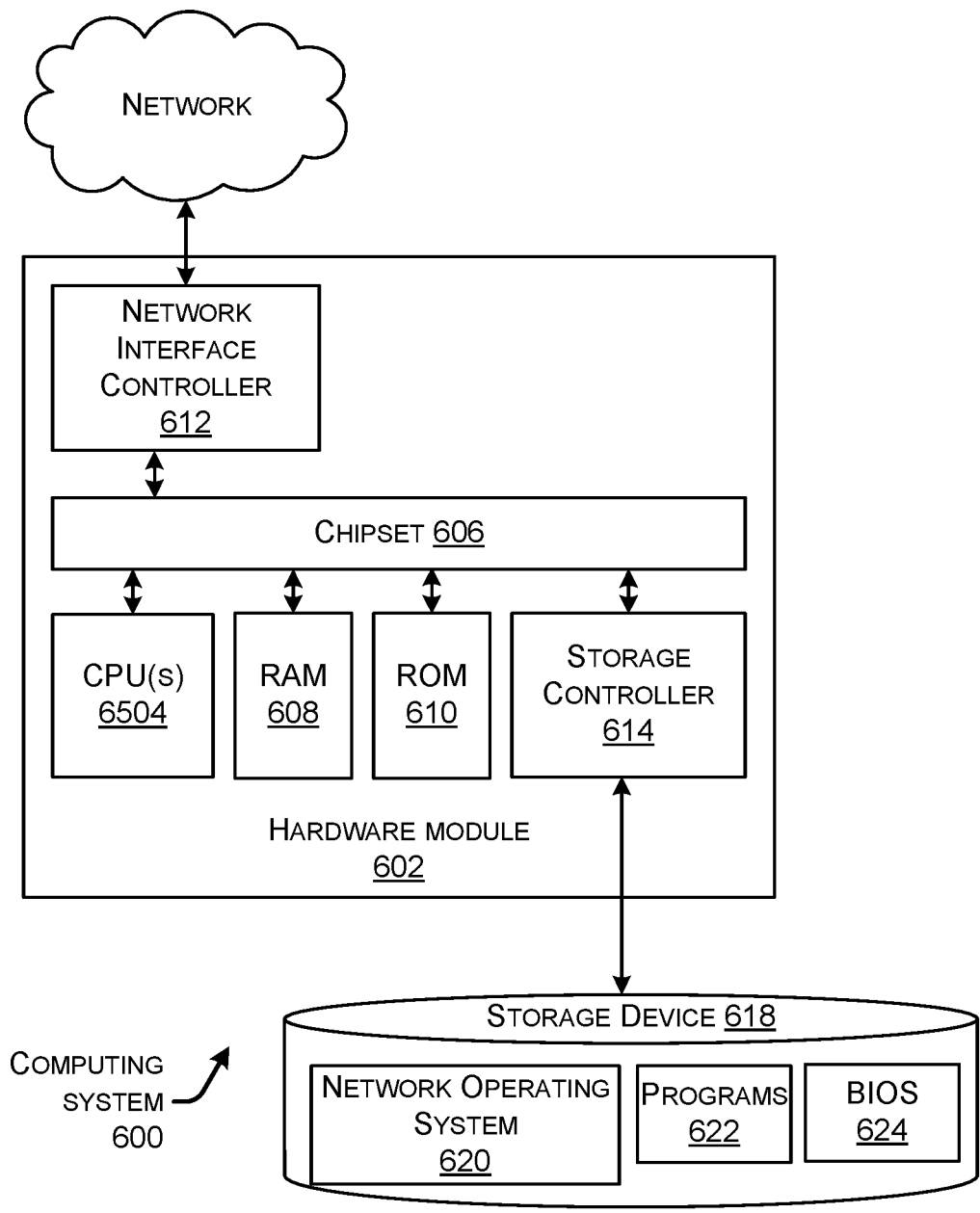
FIG. 6 shows an example computer architecture for a computing system capable of executing program components for implementing the functionality described above.

FIG. 6 shows an example computer architecture for a computing system 600 capable of executing program components for implementing the functionality described above. The computer architecture shown in FIG. 6 illustrates a computing device assembled from modular components, and can be utilized to execute any of the software components presented herein. The computing system 600 may, in some examples, be a computing host as described above.

One or more hardware modules 602 installed in a computing system 600 may be a physical card or module to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the hardware module 602.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the hardware module 602. The chipset 606 can provide an interface to a RAM 608, used as the main memory in the hardware module 602. The chipset 606 can further provide an interface to a computer-readable storage medium such as a read-only memory ("ROM") 610 or non-volatile RAM ("NVRAM") for storing basic routines that help to startup the hardware module 602 and to transfer information between the various components and devices. The ROM 610 or NVRAM can also store other software components necessary for the operation of the hardware module 602 in accordance with the configurations described herein.

The hardware module 602 can operate in a networked environment using logical connections to remote computing devices and computer systems through a network, such as one or more networks as described above. The chipset 606 can include functionality for providing network connectivity through a NIC 612, such as a gigabit Ethernet adapter. The NIC 612 is capable of connecting the hardware module 602 to other computing devices over the network 608. It should be appreciated that multiple NICs 612 can be present in the hardware module 602, connecting the switch 600 to other types of networks and remote computer systems.

The hardware module 602 can be connected to a storage device 618 that provides non-volatile storage for the hardware module 602. The storage device 618 can store an operating system 620, programs 622, a BIOS 624, and data, which have been described in greater detail herein. The storage device 618 can be connected to the hardware module 602 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 602 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the hardware module 602 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 602 can further read information from the storage device 618 by detecting the physical states or characteristics of one or more particular locations within the physical storage units.

In addition to the mass storage device 618 described above, the hardware module 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 602. In some examples, the operations performed by a switch of the network overlay, and or any components included therein, may be supported by one or more devices similar to the hardware module 602. Stated otherwise, some or all of the operations performed by a switch of the network overlay, and or any components included therein, may be performed by one or more hardware modules 602 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the hardware module 602. According to one embodiment, the operating system comprises the LINUX operating system and derivatives thereof. According to another embodiment, the operating system comprises the WINDOWS operating system from MICROSOFT CORPORATION of Redmond, Washington. It should be appreciated that other operating systems can also be utilized. The storage device 618 can store other system or application programs and data utilized by the hardware module 602.

In one embodiment, the storage device 618 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 602 by specifying how the CPUs 604 transition between states, as described above. According to one embodiment, the hardware module 602 has access to computer-readable storage media storing computer-executable instructions which, when executed by the hardware module 602, perform the various processes described above with regard to FIGS. 1-5. The hardware module 502 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing system comprising:
   one or more processing units; and one or more non-transitory computer-readable media storing computer-executable instructions that, when executed by the one or more processing units, cause the one or more processing units to:
   record a Merkle tree state used to generate a one-time signature ("OTS") key pair and record an issued hash-based signature ("HBS") in an immutably ordered log; and
   autonomously report non-reuse or reuse of a Merkle tree state recorded in the immutably ordered log, such that the reporting verifies that a Merkle tree had a particular state when used to generate an OTS key pair of a particular issued OTS, or verifies that a current Merkle tree state was not previously used to generate any OTS key pair before a signing module generates an OTS key pair in response to a signing request.

2. The computing system of claim 1, wherein the instructions further cause the one or more processing units to receive an internal state query including an internally queried Merkle state.

3. The computing system of claim 2, wherein the instructions further cause the one or more processing units to look up the internally queried state in the immutably ordered log, returning if either no HBS or only one HBS is associated with the internally queried state.

4. The computing system of claim 3, wherein the instructions further cause the one or more processing units to compare the internally queried HBS with the returned HBS.

5. The computing system of claim 1, wherein the recorded Merkle tree state is a state of a Merkle tree used to generate an OTS key pair of the HBS, and the Merkle tree state and the HBS are recorded separately in association in an entry of the log.

* * * * *